United States Patent [19]

Poole

[11] 3,993,216

[45] Nov. 23, 1976

[54] PLURAL PILL DELIVERING APPARATUS

[75] Inventor: John E. Poole, Holland, Ohio

[73] Assignee: Owens-Illinois, Inc., Toledo, Ohio

[22] Filed: Aug. 7, 1975

[21] Appl. No.: 602,848

[52] U.S. Cl. .................................. 221/93; 221/278
[51] Int. Cl.[2] ....................... B65H 3/08; B65H 3/44
[58] Field of Search ............... 221/68, 93, 278, 296

[56] References Cited

UNITED STATES PATENTS

| 2,502,186 | 3/1950 | Tuohy | 221/93 X |
|---|---|---|---|
| 3,266,667 | 8/1966 | MacDonald | 221/278 X |
| 3,517,856 | 6/1970 | Ginther | 221/278 |
| 3,525,846 | 8/1970 | Spisak | 221/278 X |
| 3,647,129 | 3/1972 | Ehrlich | 221/278 X |

FOREIGN PATENTS OR APPLICATIONS

| 469,081 | 7/1965 | Japan | 221/278 |

*Primary Examiner*—Robert B. Reeves
*Assistant Examiner*—Francis J. Bartuska
*Attorney, Agent, or Firm*—D. T. Innis; E. J. Holler

[57] ABSTRACT

Apparatus is described for delivering two sulfur pellets or pills to the interior of hot glass containers which are moving on a conveyor. The pill delivery apparatus is supplied, through a magazine, with pills to a gating mechanism. The gating device which is pneumatically actuated, isolates two pills from the magazine, places the pills in the inlet to a delivery tube and then air under pressure, which actuates the gating device, is delivered to the two pills to pneumatically dispatch the pills through the delivery tube. The delivery tube has its delivery end positioned over the bottle conveyor so that the pills enter through the finish or neck of the bottle.

4 Claims, 3 Drawing Figures

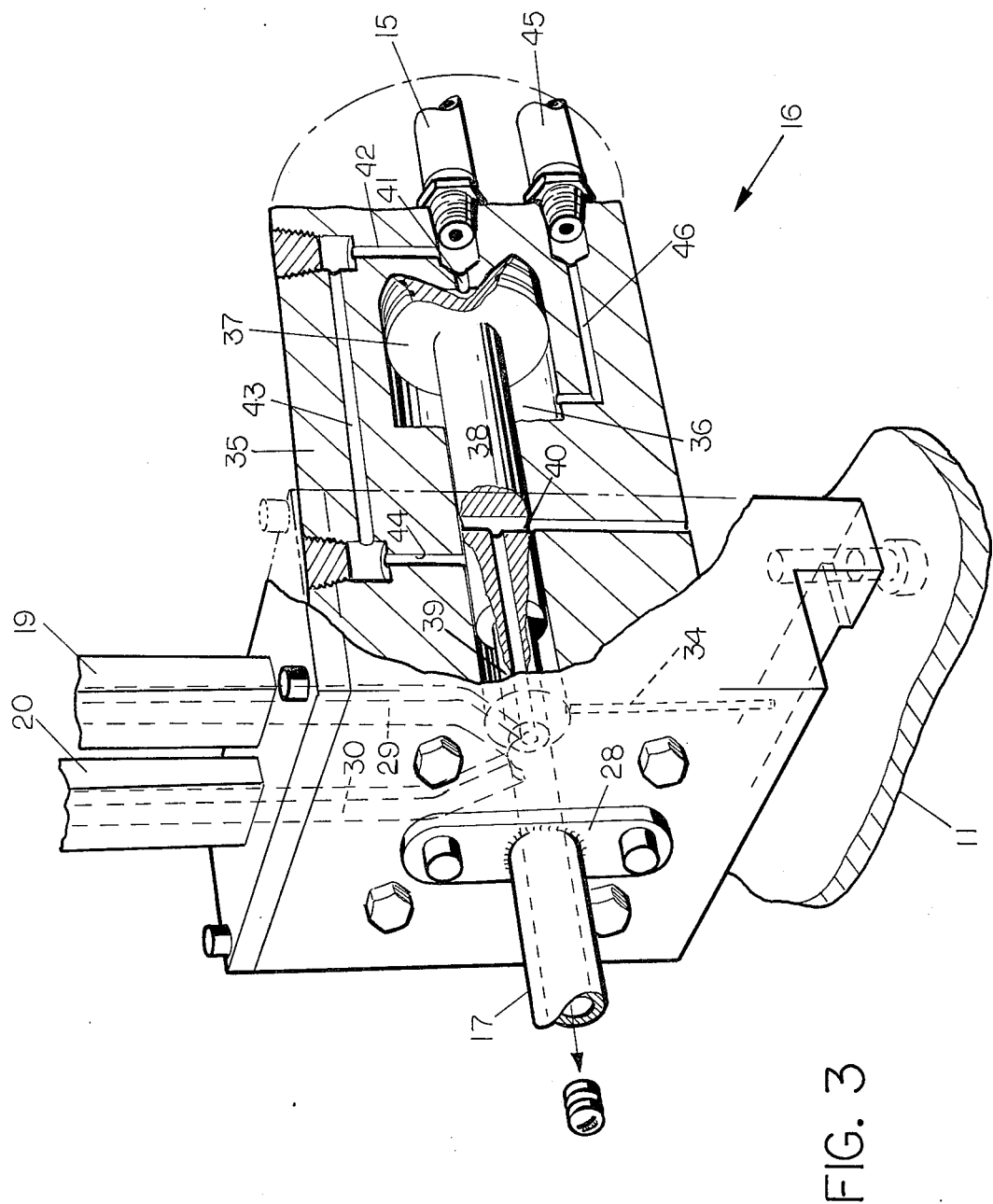

PLURAL PILL DELIVERING APPARATUS

BACKGROUND OF THE INVENTION

Glass containers, such as bottles and jars, frequently are used in the packaging of liquids which may leach the alkali out of the interior surface of the glass structure. In order to avoid this leaching and the resultant appearance of contamination of the liquid to be contained in the bottle, it has been the practice in the past to internally treat the glassware with an acidic gas. Such gases, for example, have been sulfur dioxide or trioxide and it has been the practice to accomplish this internal acidic gas treatment by placing pellets of sulfur in the hot bottles as they are moving from the glass forming machine to the annealing lehr. At this stage of the process of formation of the glass bottles, the containers are sufficiently hot to cause the sulfur to vaporize and thereby create an acidic gas which neutralizes the alkalinity of the interior glass surface. One such prior art patent teaches the addition of sulfur pellets to hot bottles as they are moving from the forming machine to the annealing lehr. This patent is to U. E. Bowes, U.S. Pat. No. 2,046,302, issued June 30, 1936. Another system accomplishing a similar result is disclosed in application Ser. No. 571,149 filed Apr. 24, 1975, in which pellets that have been delivered to a gating device are positioned by the gating device into a delivery tube and then pneumatically delivered to the interior of the containers. The present invention, in effect, constitutes an improvement in the gating mechanism which will permit the pellets to be isolated and then delivered with a minimum of mechanical movement and with the operation of a single pneumatic plunger.

DESCRIPTION OF THE PRIOR ART

Bowes' U.S. Pat. No. 2,046,302 teaches the feeding of sulfur pellets to the interior of hot containers by an apparatus which sorts and delivers the pills one at a time through an elongated dispensing tube whose outlet end is positioned above and in alignment with the path of travel of the newly formed containers. The pill dispenser necessarily must be synchronized, as is shown in Bowes' patent, with the movement of the belt on which the newly formed containers are placed, it being assumed that they will be placed on the conveyor or belt in the Bowes' device at regularly spaced intervals. The interconnection between the pill dispensing device and the conveyor drive is such as to assure the delivery of a pellet or pill into the interior of each container, provided the containers are set apart a fixed, known distance on the conveyor.

SUMMARY OF THE INVENTION

In the delivery of acidic gas producing pills or pellets to the interior of hot glass containers, the apparatus of the invention functions to deliver a preselected number of pills to each container regardless of the speed of the conveyance of the containers with a gating device which is pneumatically actuated serving to isolate the requisite number of pills from the supply of pills and to delivery air under pressure to a pill dispensing tube.

BRIEF DESCRIPTION OF THE DRAWINGS

FIG. 3 is a perspective view, partially in section, of the gating device of the invention.

DETAILED DESCRIPTION OF THE DRAWINGS

Figure 1:
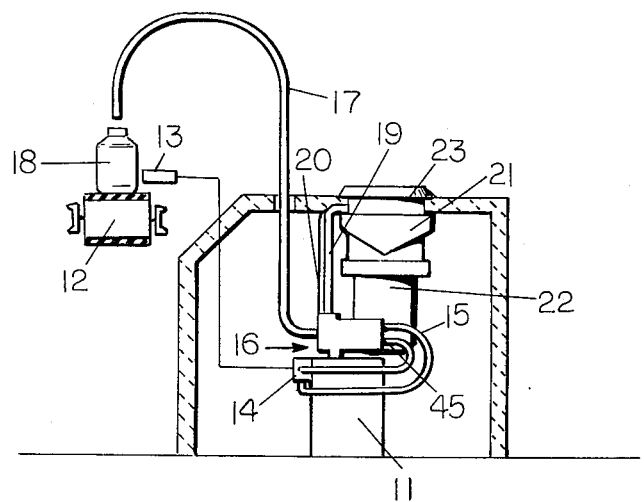
FIG. 1 is a schematic elevational view of the apparatus of the invention showing its relationship to a container conveying system for newly formed containers.

With reference to FIG. 1, an enclosure 10 surrounds a pedestal 11 that rests on the floor adjacent the run of a forming machine conveyor 12. The conveyor 12 carries the hot bottles from a forming machine to an annealing lehr in the manner taught in application Ser. No. 571,149 filed Apr. 24, 1975. A bottle presence sensor 13 will tell when a bottle is at a specific location on the conveyor.

The sensor 13 will send a signal to a relay 14 which triggers air under pressure through a line 15 connected to a pellet separator and ejector or gating mechanism 16. Pellets ejected by the mechanism 16 are propelled through a delivery tube 17. The delivery end of the tube 17 is positioned above and in alignment with the path of travel of containers 18 on the conveyor 12 so that upon operation of the ejector 16, pellets are fed to the interior of hot containers 18 positioned on the conveyor 12.

The pellets which are fed to the ejector 16 are supplied thereto through a pair of magazines 19 and 20. The magazines 19 and 20 are maintained full of pellets by a pellet supply container 21 which takes the form of a conical hopper rotated by a motor 22. The hopper will sort the pellets into single line and feed them into the upper ends of magazines 19 and 20. The container 21 is shown as having a cover 23, removal of which permits additional pellets being supplied to the rotating container or hopper 21.

Figure 2:
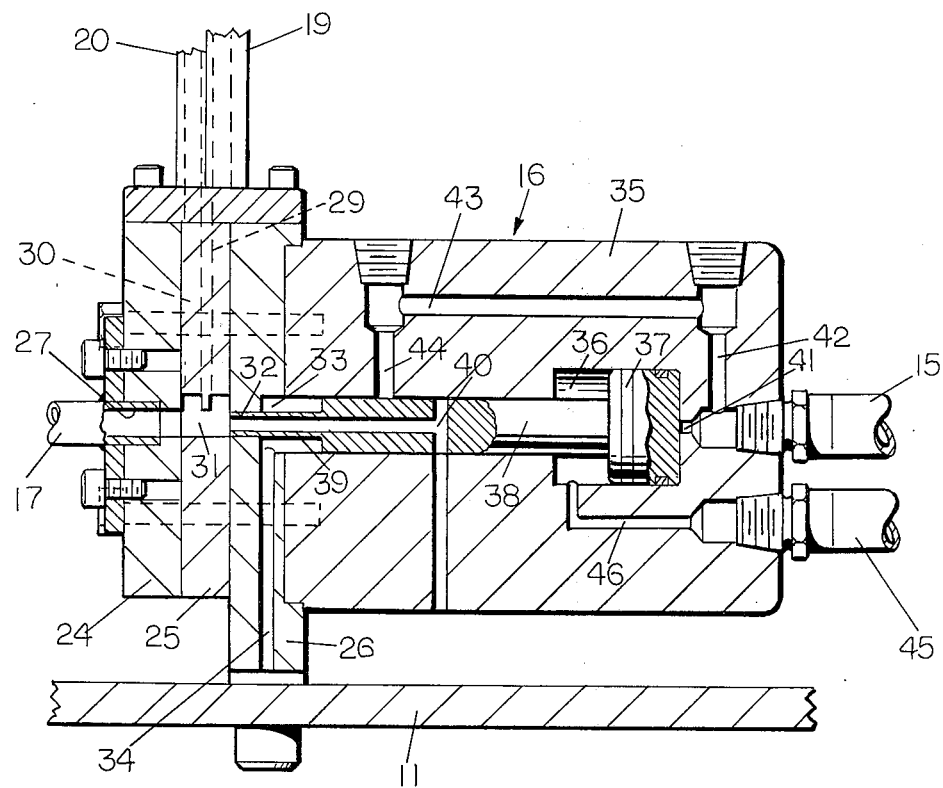
FIG. 2 is a sectional, elevational view of the gating and pellet propulsion apparatus of the invention.

With particular reference to FIGS. 2 and 3, a detailed description of the separator and ejector or gating device 16 will be given. The device 16 is generally composed of three plate-like members 24, 25 and 26 assembled in facing relationship. The member 24 has a generally central opening 27 formed therein within which the end of the tube 17 extends. Adjacent this end, the tube 17 is welded to a plate 28, which in turn is bolted to the member 24 to secure the end of the tube 17 within the opening 27 formed in the plate 24. The plate 24 is bolted to a plate 25 which serves as the locater for pellets from the magazines 19 and 20. It should be understood that the magazines 19 and 20 communicate with a pair of passages 29 and 30 in the plate 25 and that the passages extend downwardly and converge, as best seen in FIG. 3, into a central opening 31 formed in the member 25. The third member 26 is bolted to the pedestal 11 and serves as the main support member for the ejector 16. The member 26 also has a cylindrical opening 32 of a fairly precise dimension and a further opening 33 of larger diameter which is coaxial with the opening 32. A downwardly extending passageway 34 communicates with the opening 33 and opens to the atmosphere.

The plate 26 also serves as a mounting member for an air motor 35. The motor 35 basically is in the form of a cylindrical casting provided with a cylinder portion 36 within which a piston 37 is positioned with a piston rod 38 extending in the direction of the plate-like member 26. The piston rod 38 is of a diameter essentially similar to the opening 33 formed in the member 26, with an extreme extending end 39 of the piston rod 38 being reduced in outside diameter to pass, with little clearance, through the opening 32 in the plate-like member 26. The end 39 of the rod 38 is hollow and, in effect, forms a hollow plunger. The piston rod, in effect, is drilled from the extending end 39 to a position about half way of the length thereof and communicates with a radial or cross-passage 40 in the rod 38. The air pressure delivery line 15 is connected to a threaded opening in the motor 35 in communication through a passage 41 to the interior of cylinder 36 to the right of piston 37. A branch passage 42 formed in motor casting 35 is connected through a horizontal passage 43 to a passageway 44 which opens into the cylindrical guideway for the piston rod 38.

As can best be seen in FIG. 2, introduction of air under pressure in line 15 will move the piston 37 to the left, at which time pellets which are located in the opening 31, will be moved forward by the hollow plunger or extending end 39 of the rod 38 and any air which may be trapped in front of the rod 38 will be exhausted through the passageway 34. This forward movement of the rod end 39 also isolates the location 31 from entry of additional pellets for as long as the rod end is extended. When the piston 37 has travelled a distance sufficient to bring the cross-passage 40 into alignment with the passageway 44, the air under pressure in the passages 42, 43 and 44 will pressurize the bore of the rod 38 and cause the pellets to be ejected in the manner illustrated in FIG. 3. After the ejection has been effected, the time delay relay 14 will switch the air under pressure from the line 15 to a line 45 which communicates with the forward end of the cylinder 36 through a passage 46. This will effect the return of piston 37 to the position shown, preparatory to actuation and operation through the cycle again upon receipt of a signal from the sensor 13.

Thus it can be seen that the above-described apparatus will function to deliver pills to the interior of the container when a container is positioned on the conventional cross-conveyor in alignment with the delivery end of the delivery tube. Timing of the operation of the pill delivery system is thus independent of the conveyor speed and the spacing of the containers on the conveyor is not of a critical nature as long as there is some interval between the containers. The mechanism of the gating system is of particular simplicity, in that it requires only the operation of a single valve as introducing air under pressure to move the piston forward carrying the plunger therewith to isolate the two pellets and on further movement, to connect the interior of the hollow plunger to the source of air under pressure.

I claim:

1. In apparatus for delivering pills to the interior of glass containers moving on a conveyor, including a pill feeder and a pair of magazines with the magazines extending from the feeder to the inlet end of a dispensing tube, and a gating device for selectively moving a predetermined number of pills into the inlet of the dispensing tube and isolating the magazines from the inlet, the improvement in said gating device comprising:

three plate-like members;
means mounting said members in facing relationship;
a first member formed with a central opening therethrough having a diameter substantially equal to the diameter of the pills and a length greater than the width of two pills;
a second member having a central opening formed therein, said second member having a pair of pill directing slots formed therein that converge at the central area thereof in alignment with the opening in the first member;
said magazines connected to said slots;
a third member having a central opening formed therein in alignment with the central area of said first and second members;
a cylinder connected to said third member;
a piston in said cylinder;
a piston rod connected to said piston;
said piston rod extending in a bore in said cylinder in the direction of the central openings in said first and second members;
said piston rod being formed with a reduced diameter end that extends into and closes said central opening in said third member;
said piston rod having a central bore therein extending from its free end to an intermediate point in its length;
a diametrically extending passage in said rod at the intermediate point in the piston rod;
a source of air under pressure connected to said cylinder for moving said piston;
a side passage in said cylinder extending from the air source connection to said cylinder to a port in the side of the cylinder bore in which the piston rod extends;
said port being in alignment with said diametrically extending passage when the piston and rod have completed their movement in the direction of said plates, whereby the reduced end of said rod will move one or more pills from the central opening in said second plate into the central opening in said first plate and air under pressure will propel the pills out of the central openings into a delivery tube.

2. The apparatus of claim 1 wherein said cylinder is generally horizontal and said piston and plunger reciprocate on a horizontal axis which is coaxial with the inlet to said dispensing tube.

3. Apparatus for delivering pills to the interior of glass containers moving on a conveyor, comprising:

a pill sorter and feeder;
a dispensing tube;
a pair of pill magazines extending from the feeder to the inlet end of said dispensing tube;
a gating device for selectively moving a predetermined number of pills from the outlet of said magazines into the inlet of the dispensing tube and isolating the magazines from the inlet, said gating device comprising:
three plate-like members;
means mounting said members in facing relationship;
a first member formed with a central opening therethrough having a diameter substantially equal to the diameter of the pills and a length greater than the width of two pills;
a second member having a central opening formed therein, said second member having a pair of pill directing slots formed therein that converge at the central area thereof in alignment with the opening in the first member;
said magazines connected to said slots;
a third member having a central opening formed therein in alignment with the central area of said first and second members;
a cylinder connected to said third member;
a piston in said cylinder;
a piston rod connected to said piston;

said piston rod extending in a bore in said cylinder in the direction of the central openings in said first and second members;
said piston rod being formed with a reduced diameter end that extends into and closes said central opening in said third member;
said piston rod having a central bore therein extending from its free end to an intermediate point in its length;
a diametrically extending passage in said rod at the intermediate point in the piston rod;
a source of air under pressure connected to said cylinder for moving said piston;
a side passage in said cylinder extending from the air source connection to said cylinder to a port in the side of the cylinder bore in which the piston rod extends;
said port being in alignment with said diametrically extending passage when the piston and rod have completed their movement in the direction of said plates, whereby the reduced end of said rod will move one or more pills from the central opening in said second plate into the central opening in said first plate and air under pressure will propel the pills out of the central openings into a delivery tube.

4. The apparatus of claim 3 wherein said cylinder is generally horizontal and said piston and plunger reciprocate on a horizontal axis which is coaxial with the inlet to said dispensing tube.

* * * * *